(12) United States Patent
Kim et al.

(10) Patent No.: US 12,117,946 B2
(45) Date of Patent: Oct. 15, 2024

(54) NEURAL NETWORK PROCESSOR

(71) Applicant: FuriosaAI Co., Seoul (KR)

(72) Inventors: Han Joon Kim, Hwaseong-Si (KR); Young Geun Choi, Seoul (KR); Byung Chul Hong, Seongnam-Si (KR)

(73) Assignee: FuriosaAI Co., Seoul (KR)

( * ) Notice: Subject to any disclaimer, the term of this patent is extended or adjusted under 35 U.S.C. 154(b) by 0 days.

(21) Appl. No.: 18/003,031

(22) PCT Filed: Oct. 12, 2020

(86) PCT No.: PCT/KR2020/013849
§ 371 (c)(1),
(2) Date: Dec. 22, 2022

(87) PCT Pub. No.: WO2021/261666
PCT Pub. Date: Dec. 30, 2021

(65) Prior Publication Data
US 2023/0244620 A1 Aug. 3, 2023

(30) Foreign Application Priority Data
Jun. 22, 2020 (KR) .................. 10-2020-0075628

(51) Int. Cl.
*G06F 13/20* (2006.01)
*G06N 3/04* (2023.01)
*G06N 3/063* (2023.01)

(52) U.S. Cl.
CPC .......... *G06F 13/20* (2013.01); *G06F 2213/40* (2013.01)

(58) Field of Classification Search
CPC ............................ G06F 21/6218; G06N 3/063
See application file for complete search history.

(56) References Cited

U.S. PATENT DOCUMENTS 5,274,745 A * 12/1993 Suzuoka ............... G06N 3/048
706/26
11,880,760 B2 * 1/2024 Ovsiannikov ......... G06F 9/3001
(Continued)

FOREIGN PATENT DOCUMENTS

| KR | 101310769 B1 | 9/2013 |
| KR | 101486025 B1 | 1/2015 |

(Continued)

OTHER PUBLICATIONS

International Search Report issued in International Application No. PCT/KR2020/013849, mailed Mar. 11, 2021 (7 pages).

(Continued)

*Primary Examiner* — Getente A Yimer
(74) *Attorney, Agent, or Firm* — Osha Bergman Watanabe & Burton LLP

(57) ABSTRACT

The present specification discloses a calculation processing device which has a high processing rate with low cost. The calculation processing device according to the present specification is a calculation processing device including a fetch unit which reads, from a memory, data required for a calculation to perform processing of a neural network, and provides the data to a calculation unit. The fetch unit may comprise: multiple routers each having a data processing mapping table in which a scheme of processing input data is recorded according to a node identifier (ID) of the input data; and a fetch network controller which controls respective data processing mapping tables of the multiple routers.

13 Claims, 13 Drawing Sheets

(56) References Cited

U.S. PATENT DOCUMENTS

| | | | |
|---|---|---|---|
| 2017/0212520 A1* | 7/2017 | Liu | G06K 7/1417 |
| 2017/0357891 A1 | 12/2017 | Judd | |
| 2018/0253636 A1* | 9/2018 | Lee | G06N 3/063 |
| 2020/0311627 A1* | 10/2020 | Marcos | G06F 21/6218 |
| 2021/0397968 A1* | 12/2021 | Thiele | G06N 3/084 |

FOREIGN PATENT DOCUMENTS

| | | |
|---|---|---|
| KR | 20180133672 A | 12/2018 |
| KR | 20190035551 A | 4/2019 |
| KR | 20190116024 A | 10/2019 |

OTHER PUBLICATIONS

Written Opinion issued in International Application No. PCT/KR2020/013849; Dated Mar. 11, 2021 (7 pages).

* cited by examiner

| ID | #1 | #2 | #3 | #4 | #5 | #6 | #7 | #8 |
|---|---|---|---|---|---|---|---|---|
| BLOCK | 0 | 1 | 1 | 1 | 1 | 1 | 1 | 1 |
| REFLECT | 1 | 0 | 0 | 0 | 0 | 0 | 0 | 0 |
| OUTPUT | 1 | 0 | 0 | 0 | 0 | 0 | 0 | 0 |

232-2

| ID | #1 | #2 | #3 | #4 | #5 | #6 | #7 | #8 |
|---|---|---|---|---|---|---|---|---|
| BLOCK | 1 | 0 | 1 | 1 | 1 | 1 | 1 | 1 |
| REFLECT | 0 | 1 | 0 | 0 | 0 | 0 | 0 | 0 |
| OUTPUT | 0 | 1 | 0 | 0 | 0 | 0 | 0 | 0 |

232-3

| ID | #1 | #2 | #3 | #4 | #5 | #6 | #7 | #8 |
|---|---|---|---|---|---|---|---|---|
| BLOCK | 1 | 1 | 0 | 1 | 1 | 1 | 1 | 1 |
| REFLECT | 0 | 0 | 1 | 0 | 0 | 0 | 0 | 0 |
| OUTPUT | 0 | 0 | 1 | 0 | 0 | 0 | 0 | 0 |

232-4

| ID | #1 | #2 | #3 | #4 | #5 | #6 | #7 | #8 |
|---|---|---|---|---|---|---|---|---|
| BLOCK | 1 | 1 | 1 | 0 | 1 | 1 | 1 | 1 |
| REFLECT | 0 | 0 | 0 | 1 | 0 | 0 | 0 | 0 |
| OUTPUT | 0 | 0 | 0 | 1 | 0 | 0 | 0 | 0 |

232-5

| ID | #1 | #2 | #3 | #4 | #5 | #6 | #7 | #8 |
|---|---|---|---|---|---|---|---|---|
| BLOCK | 1 | 1 | 1 | 1 | 0 | 1 | 1 | 1 |
| REFLECT | 0 | 0 | 0 | 0 | 1 | 0 | 0 | 0 |
| OUTPUT | 0 | 0 | 0 | 0 | 1 | 0 | 0 | 0 |

232-6

| ID | #1 | #2 | #3 | #4 | #5 | #6 | #7 | #8 |
|---|---|---|---|---|---|---|---|---|
| BLOCK | 1 | 1 | 1 | 1 | 1 | 0 | 1 | 1 |
| REFLECT | 0 | 0 | 0 | 0 | 0 | 1 | 0 | 0 |
| OUTPUT | 0 | 0 | 0 | 0 | 0 | 1 | 0 | 0 |

232-7

| ID | #1 | #2 | #3 | #4 | #5 | #6 | #7 | #8 |
|---|---|---|---|---|---|---|---|---|
| BLOCK | 1 | 1 | 1 | 1 | 1 | 1 | 0 | 1 |
| REFLECT | 0 | 0 | 0 | 0 | 0 | 0 | 1 | 0 |
| OUTPUT | 0 | 0 | 0 | 0 | 0 | 0 | 1 | 0 |

232-8

| ID | #1 | #2 | #3 | #4 | #5 | #6 | #7 | #8 |
|---|---|---|---|---|---|---|---|---|
| BLOCK | 1 | 1 | 1 | 1 | 1 | 1 | 1 | 0 |
| REFLECT | 0 | 0 | 0 | 0 | 0 | 0 | 0 | 1 |
| OUTPUT | 0 | 0 | 0 | 0 | 0 | 0 | 0 | 1 |

| ID | #1 | #2 | #3 | #4 | #5 | #6 | #7 | #8 |
|---|---|---|---|---|---|---|---|---|
| BLOCK | 0 | 0 | 1 | 1 | 1 | 1 | 1 | 1 |
| REFLECT | 1 | 1 | 0 | 0 | 0 | 0 | 0 | 0 |
| OUTPUT | 1 | 1 | 0 | 0 | 0 | 0 | 0 | 0 |

232-2

| ID | #1 | #2 | #3 | #4 | #5 | #6 | #7 | #8 |
|---|---|---|---|---|---|---|---|---|
| BLOCK | 0 | 0 | 1 | 1 | 1 | 1 | 1 | 1 |
| REFLECT | 1 | 0 | 0 | 1 | 0 | 0 | 0 | 0 |
| OUTPUT | 1 | 1 | 0 | 0 | 0 | 0 | 0 | 0 |

232-3

| ID | #1 | #2 | #3 | #4 | #5 | #6 | #7 | #8 |
|---|---|---|---|---|---|---|---|---|
| BLOCK | 1 | 0 | 0 | 0 | 1 | 1 | 1 | 1 |
| REFLECT | 0 | 0 | 1 | 1 | 0 | 0 | 0 | 0 |
| OUTPUT | 0 | 1 | 1 | 0 | 0 | 0 | 0 | 0 |

232-4

| ID | #1 | #2 | #3 | #4 | #5 | #6 | #7 | #8 |
|---|---|---|---|---|---|---|---|---|
| BLOCK | 1 | 1 | 0 | 0 | 0 | 1 | 1 | 1 |
| REFLECT | 0 | 0 | 0 | 1 | 1 | 0 | 0 | 0 |
| OUTPUT | 0 | 0 | 1 | 1 | 0 | 0 | 0 | 0 |

232-5

| ID | #1 | #2 | #3 | #4 | #5 | #6 | #7 | #8 |
|---|---|---|---|---|---|---|---|---|
| BLOCK | 1 | 1 | 1 | 1 | 0 | 0 | 1 | 1 |
| REFLECT | 0 | 0 | 0 | 0 | 1 | 1 | 0 | 0 |
| OUTPUT | 0 | 0 | 0 | 1 | 1 | 0 | 0 | 0 |

232-6

| ID | #1 | #2 | #3 | #4 | #5 | #6 | #7 | #8 |
|---|---|---|---|---|---|---|---|---|
| BLOCK | 1 | 1 | 1 | 1 | 0 | 0 | 1 | 1 |
| REFLECT | 0 | 0 | 0 | 0 | 1 | 0 | 0 | 0 |
| OUTPUT | 0 | 0 | 0 | 0 | 1 | 1 | 0 | 0 |

232-7

| ID | #1 | #2 | #3 | #4 | #5 | #6 | #7 | #8 |
|---|---|---|---|---|---|---|---|---|
| BLOCK | 1 | 1 | 1 | 1 | 1 | 1 | 0 | 0 |
| REFLECT | 0 | 0 | 0 | 0 | 0 | 0 | 1 | 1 |
| OUTPUT | 0 | 0 | 0 | 0 | 0 | 1 | 1 | 1 |

232-8

| ID | #1 | #2 | #3 | #4 | #5 | #6 | #7 | #8 |
|---|---|---|---|---|---|---|---|---|
| BLOCK | 1 | 1 | 1 | 1 | 1 | 1 | 0 | 0 |
| REFLECT | 0 | 0 | 0 | 0 | 0 | 0 | 1 | 0 |
| OUTPUT | 0 | 0 | 0 | 0 | 0 | 0 | 1 | 1 |

| ID | #1 | #2 | #3 | #4 | #5 | #6 | #7 | #8 |
|---|---|---|---|---|---|---|---|---|
| BLOCK | 0 | 1 | 0 | 0 | 1 | 1 | 1 | 1 |
| REFLECT | 1 | 1 | 1 | 1 | 0 | 0 | 0 | 0 |
| OUTPUT | 1 | 1 | 1 | 1 | 0 | 0 | 0 | 0 |

232-2

| ID | #1 | #2 | #3 | #4 | #5 | #6 | #7 | #8 |
|---|---|---|---|---|---|---|---|---|
| BLOCK | 0 | 0 | 0 | 0 | 1 | 1 | 1 | 1 |
| REFLECT | 0 | 0 | 1 | 1 | 0 | 0 | 0 | 0 |
| OUTPUT | 1 | 1 | 1 | 1 | 0 | 0 | 0 | 0 |

232-3

| ID | #1 | #2 | #3 | #4 | #5 | #6 | #7 | #8 |
|---|---|---|---|---|---|---|---|---|
| BLOCK | 0 | 0 | 0 | 0 | 1 | 1 | 1 | 1 |
| REFLECT | 0 | 0 | 1 | 1 | 0 | 0 | 0 | 0 |
| OUTPUT | 1 | 1 | 1 | 1 | 0 | 0 | 0 | 0 |

232-4

| ID | #1 | #2 | #3 | #4 | #5 | #6 | #7 | #8 |
|---|---|---|---|---|---|---|---|---|
| BLOCK | 0 | 0 | 0 | 0 | 1 | 1 | 1 | 1 |
| REFLECT | 0 | 0 | 0 | 0 | 0 | 0 | 0 | 0 |
| OUTPUT | 1 | 1 | 1 | 0 | 0 | 0 | 0 | 0 |

232-5

| ID | #1 | #2 | #3 | #4 | #5 | #6 | #7 | #8 |
|---|---|---|---|---|---|---|---|---|
| BLOCK | 1 | 1 | 1 | 1 | 0 | 0 | 0 | 0 |
| REFLECT | 0 | 0 | 0 | 0 | 1 | 1 | 1 | 1 |
| OUTPUT | 0 | 0 | 0 | 0 | 1 | 1 | 1 | 1 |

232-6

| ID | #1 | #2 | #3 | #4 | #5 | #6 | #7 | #8 |
|---|---|---|---|---|---|---|---|---|
| BLOCK | 1 | 1 | 1 | 1 | 0 | 0 | 0 | 0 |
| REFLECT | 0 | 0 | 0 | 0 | 0 | 0 | 0 | 0 |
| OUTPUT | 0 | 0 | 0 | 0 | 1 | 1 | 1 | 1 |

232-7

| ID | #1 | #2 | #3 | #4 | #5 | #6 | #7 | #8 |
|---|---|---|---|---|---|---|---|---|
| BLOCK | 1 | 1 | 1 | 1 | 0 | 0 | 0 | 0 |
| REFLECT | 0 | 0 | 0 | 0 | 0 | 0 | 0 | 0 |
| OUTPUT | 0 | 0 | 0 | 0 | 1 | 1 | 1 | 1 |

232-8

| ID | #1 | #2 | #3 | #4 | #5 | #6 | #7 | #8 |
|---|---|---|---|---|---|---|---|---|
| BLOCK | 1 | 1 | 1 | 1 | 0 | 0 | 0 | 0 |
| REFLECT | 0 | 0 | 0 | 0 | 0 | 0 | 0 | 0 |
| OUTPUT | 0 | 0 | 0 | 1 | 1 | 1 | 1 | 1 |

| ID | #1 | #2 | #3 | #4 | #5 | #6 | #7 | #8 |
|---|---|---|---|---|---|---|---|---|
| BLOCK | 0 | 0 | 0 | 0 | 0 | 0 | 0 | 0 |
| REFLECT | 1 | 1 | 1 | 1 | 1 | 1 | 1 | 1 |
| OUTPUT | 1 | 1 | 1 | 1 | 1 | 1 | 1 | 1 |

232-2

| ID | #1 | #2 | #3 | #4 | #5 | #6 | #7 | #8 |
|---|---|---|---|---|---|---|---|---|
| BLOCK | 0 | 0 | 0 | 0 | 0 | 0 | 0 | 0 |
| REFLECT | 0 | 0 | 0 | 0 | 0 | 1 | 1 | 1 |
| OUTPUT | 1 | 1 | 1 | 1 | 1 | 1 | 1 | 1 |

232-3

| ID | #1 | #2 | #3 | #4 | #5 | #6 | #7 | #8 |
|---|---|---|---|---|---|---|---|---|
| BLOCK | 0 | 0 | 0 | 0 | 0 | 0 | 0 | 0 |
| REFLECT | 0 | 0 | 0 | 0 | 0 | 1 | 1 | 1 |
| OUTPUT | 1 | 1 | 1 | 1 | 1 | 1 | 1 | 1 |

232-4

| ID | #1 | #2 | #3 | #4 | #5 | #6 | #7 | #8 |
|---|---|---|---|---|---|---|---|---|
| BLOCK | 0 | 0 | 0 | 0 | 0 | 0 | 0 | 0 |
| REFLECT | 0 | 1 | 1 | 1 | 1 | 1 | 1 | 1 |
| OUTPUT | 1 | 1 | 1 | 1 | 1 | 1 | 1 | 1 |

232-5

| ID | #1 | #2 | #3 | #4 | #5 | #6 | #7 | #8 |
|---|---|---|---|---|---|---|---|---|
| BLOCK | 0 | 0 | 0 | 0 | 0 | 0 | 0 | 0 |
| REFLECT | 0 | 0 | 0 | 0 | 0 | 0 | 0 | 0 |
| OUTPUT | 1 | 1 | 1 | 1 | 1 | 1 | 1 | 1 |

232-6

| ID | #1 | #2 | #3 | #4 | #5 | #6 | #7 | #8 |
|---|---|---|---|---|---|---|---|---|
| BLOCK | 0 | 0 | 0 | 0 | 0 | 0 | 0 | 0 |
| REFLECT | 0 | 0 | 0 | 0 | 0 | 0 | 0 | 0 |
| OUTPUT | 1 | 1 | 1 | 1 | 1 | 1 | 1 | 1 |

232-7

| ID | #1 | #2 | #3 | #4 | #5 | #6 | #7 | #8 |
|---|---|---|---|---|---|---|---|---|
| BLOCK | 0 | 0 | 0 | 0 | 0 | 0 | 0 | 0 |
| REFLECT | 1 | 1 | 1 | 1 | 1 | 1 | 1 | 1 |
| OUTPUT | 1 | 1 | 1 | 1 | 1 | 1 | 1 | 1 |

232-8

| ID | #1 | #2 | #3 | #4 | #5 | #6 | #7 | #8 |
|---|---|---|---|---|---|---|---|---|
| BLOCK | 0 | 0 | 0 | 0 | 0 | 0 | 0 | 0 |
| REFLECT | 1 | 1 | 1 | 1 | 1 | 1 | 1 | 1 |
| OUTPUT | 1 | 1 | 1 | 1 | 1 | 1 | 1 | 1 |

NEURAL NETWORK PROCESSOR

TECHNICAL FIELD

The present technology relates to a neural network processor, and more particularly, to a processor for neural network calculations.

BACKGROUND ART

An artificial neural network (ANN) is artificial intelligence implemented by connecting artificial neurons mathematically modeled after neurons constituting the human brain. One mathematical model of artificial neurons is Equation (1) below. Specifically, an artificial neuron receives input signals $x_i$, separately multiplies $x_i$ by corresponding weights $w_i$, and adds the results. Subsequently, the artificial neuron calculates an activation value using an activation function and transmits the activation value to the next artificial neuron. An ANN is artificial intelligence implemented by connecting artificial neurons mathematically modeled after neurons constituting the human brain. One mathematical model of artificial neurons is Equation (1) below. Specifically, an artificial neuron receives input signals $x_i$, separately multiplies $x_i$ by corresponding weights $w_i$, and adds the results. Subsequently, the artificial neuron calculates an activation value using an activation function and transmits the activation value to the next artificial neuron.

$$y=f(w_1{}^*x_1+w_2{}^*x_2+\ldots w_n{}^*x_n)=f(\Sigma w_i{}^*x_i), \text{ where } i=1, n, n=\#\text{input signal} \quad \text{Equation (1)}$$

A deep neural network (DNN) which is a form of ANN has a layered network architecture in which artificial neurons (nodes) are stratified. A DNN includes an input layer, an output layer, and multiple hidden layers between the input layer and the output layer. The input layer includes multiple nodes to which input values are input, and the nodes of the input layer transmit output values calculated through the above-described mathematical model to nodes of the subsequent hidden layer connected to the input layer. Nodes of the hidden layer receive the input values, calculate output values, and transmit the output values to nodes of the output layer through the above-described mathematical model.

Calculation processes of deep learning which is a form of machine learning performed in a DNN may be classified as a training process in which the given DNN improves the calculation capability thereof by continuously learning training data and a process of making an inference from new input data using the DNN trained through the training process.

The inference process of deep learning is performed through forward propagation in which nodes of an input layer receive input data and then hidden layers and an output layer sequentially perform calculation in order of layers. Finally, nodes of the output layer draw a conclusion of the inference process on the basis of output values of the hidden layers.

On the other hand, in the training process of deep learning, training is performed by adjusting the weights of nodes to reduce the difference between the conclusion of the inference process and a correct answer. In general, the weights are adjusted by gradient descent. To implement gradient descent, it is necessary to calculate a differential value of the difference between the conclusion of the inference process and the correct answer with respect to the weight of each node. In this process, the differential value of the weight of a preceding node in the DNN is calculated with the chain rule of the differential value of the weight of the subsequent node in the DNN. Since the chain rule calculation is performed in the reverse direction of the inference process, a deep learning process employs backpropagation.

In other words, the DNN has a layered structure, and nodes in each layer receive result values from multiple nodes in the previous layer, output new result values by performing calculation on the basis of the above-described mathematical model of the nodes, and transfer the new result values to nodes of the next layer.

Meanwhile, the calculation structure of the DNN may be a distributed processing structure for distributing numerous calculations which are performed by nodes in each layer to multiple operation units to process the calculations. Calculations performed by nodes in each layer are distributed to multiple operation units and processed, and each operation unit reads data required for a calculation from a memory, performs the calculation, and stores the calculation result back in the memory.

RELATED ART DOCUMENTS

Patent Documents (Patent Document 1) Korean Patent Publication No. 10-2019-0116024, Oct. 14, 2019

DISCLOSURE

Technical Problem

The present invention is directed to providing a calculation processing device which has a high processing rate at a low cost.

The present specification is not limited to the objective described above, and other objectives which have not been described will be clearly understood by those of ordinary skill in the art from the following description.

Technical Solution

One aspect of the present invention provides a calculation processing device including a fetch unit which reads data required for a calculation for performing processing of a neural network from a memory and provides the data to an operation unit, the fetch unit including a plurality of routers each having a data processing mapping table in which a method of processing input data is recorded according to a node identifier (ID) of the input data and a fetch network controller configured to rebuild the data processing mapping tables of the plurality of routers to create a software topology in accordance with a calculation type.

The plurality of routers may form a one-dimensional (1D) mesh hardware topology.

In this case, each of the routers may include a main input port to which data is input from the memory, a first transmission output port configured to transmit the data to an adjacent first router, a first transmission input port to which data received from the adjacent first router is input, a second transmission output port configured to transmit the data to an adjacent second router, a second transmission input port to which data received from the adjacent second router is input, and a main output port configured to provide the data to the operation unit.

The data processing mapping tables may store information about whether or not to block, reflect, and output the input data.

The fetch network controller may set whether or not to block, reflect, and output the input data in accordance with a topology to be reconfigured.

The fetch network controller may equally set blocking and outputting in the data processing mapping tables of the routers belonging to the same group in the reconfigured topology.

The memory may include as many data memory slices as a number of the plurality of routers.

The fetch unit may include a network interface to which data stored in each of the data memory slices is fetched, a fetch network configured to transmit the data fetched to the network interface, and a feed module configured to provide the data received from the fetch network to the operation unit. In this case, the plurality of routers and the fetch network controller may be included in the fetch network.

The network interface may include a fetch buffer configured to store the fetched data and an interface controller configured to give node IDs each corresponding to the data memory slices to the fetched data.

The interface controller may control a timing of inputting the fetched data to each of the routers in accordance with each of the node IDs.

The interface controller may calculate initial waiting times of the fetched data in accordance with the node IDs and input the fetched data to the routers after the calculated initial waiting times.

The interface controller may calculate the initial waiting times using the node IDs and a variable in accordance with a software topology structure of the routers configured through the data processing mapping tables by the fetch network controller.

The interface controller may calculate an intermediate waiting time using the variable in accordance with the software topology structure of the routers.

The interface controller may input a preset size of data to each of the routers and after the intermediate waiting time ends, input the preset size of data again to each of the routers.

The interface controller may add the calculated intermediate waiting time to a waiting time of previous data and determine whether the intermediate waiting time has ended.

Other details of the present invention are included in the detailed description and drawings.

Advantageous Effects

According to the present specification, it is possible to achieve an improved calculation processing capability compared to conventional neural network processors.

Effects of the present invention are not limited to those described above, and other effects which have not been described should be clearly understood by those of ordinary skill in the art from the following description.

DESCRIPTION OF DRAWINGS

FIG. 6 is a reference diagram of a data processing mapping table according to the first embodiment;

FIG. 8 is a reference diagram of a data processing mapping table according to the second embodiment;

FIG. 10 is a reference diagram of a data processing mapping table according to the third embodiment;

FIG. 12 is a reference diagram of a data processing mapping table according to the fourth embodiment.

MODES OF THE INVENTION

Figure 1:
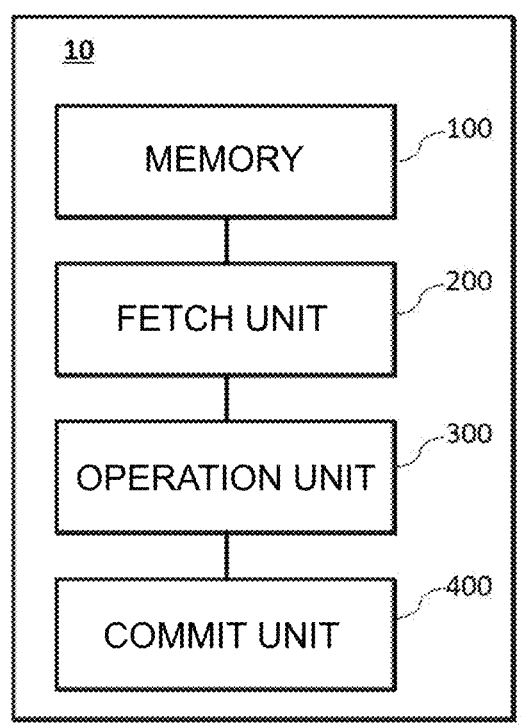
FIG. 1 is a block diagram schematically showing a configuration of a calculation processing device according to an embodiment of the present invention.

The advantages and features of the invention disclosed in the present specification and methods of achieving them will become clear through embodiments described in detail with reference to the accompanying drawings. However, the present specification is not limited to the embodiments set forth herein and can be implemented in various different forms. The embodiments are provided to make the disclosure of the present specification complete and fully convey the scope of the present specification to those skilled in the technical field to which the present specification pertains (hereinafter "those skilled in the art"). The scope of the present specification is only defined by the claims.

Terminology used in the specification is only for the purpose of describing the embodiments and is not intended to limit the scope of the present specification. In this specification, the singular also includes the plural unless particularly described in the context. As used herein, the terms "comprises" and/or "comprising" do not exclude the presence or addition of one or more components other than stated components.

Throughout the specification, like reference numbers refer to like components, and "and/or" includes any one or all possible combinations of stated components. Although "first," "second," etc. are used to describe various components, the components are not limited by the terms. These terms are used to distinguish one component from other components. Accordingly, it is apparent that a first component described below may be a second component without departing from the technical spirit of the present invention.

Unless otherwise defined, all terms (including technical and scientific terms) used in the present specification may have meanings generally understood by those of ordinary skill in the art. Also, unless clearly defined, all terms defined in generally used dictionaries are not to be ideally or excessively interpreted. Hereinafter, the embodiments of the present invention will be described with reference to the accompanying drawings.

Data used in a deep learning process may be in the form of a tensor having a size ranging from hundreds of kilobytes (Kbytes) to hundreds of megabytes (Mbytes). Such data may be stored in multiple memory banks constituting an on-chip memory.

The multiple memory banks and multiple operation units are connected to a network for data transmission. In the case of a network-on-chip, a network may be constructed in the chip and may include routers. The routers include a router for transmitting data packets received from multiple nodes to multiple nodes. The routers may perform at least one of the following operations of: i) forwarding data packets, that is, traffic, input from various directions toward a destination, ii) performing arbitration when contention occurs, and iii) performing flow control to prevent packet loss. The performance and cost of such a router are determined by a topology, a bandwidth, flow control, a buffer, etc., and naturally, a router having a high processing rate with low cost, area, and energy is necessary.

Meanwhile, in deep learning, most traffic patterns are reused several times to generate multiple pieces of output tensor data from the same tensor data. Accordingly, to reduce the number of memory accesses, a router may read input tensor data from a memory and broadcast or multicast the input tensor data to multiple operation units. According to a general multicasting method, each piece of data (e.g., a data packet) is transmitted using a destination recorded therein. This method has a problem that, when the number of nodes increases, the size of a packet header increases in proportion to the number of nodes (e.g., when a bitmap representing a destination is included in a packet header, 64 bits or more are required for 64 nodes). In general, buffered flow control involves head-of-line blocking in accordance with a buffer area. As a method of solving this problem, source throttling may be used. According to this method, when congestion occurs, it is then detected and avoided. Therefore, a network having a high processing rate at a low cost in consideration of a routing pattern characteristic of deep learning is necessary.

FIG. 1 is a block diagram schematically showing a configuration of a calculation processing device according to an embodiment of the present invention.

As shown in FIG. 1, a calculation processing device 10 may include a memory 100, a fetch unit 200, an operation unit 300, and a commit unit 400. However, the calculation processing device 10 does not necessarily include all of the memory 100, the fetch unit 200, the operation unit 300, and the commit unit 400 as shown in FIG. 1. For example, the memory 100 and the commit unit 400 may be disposed outside the calculation processing device 10.

The memory 100 may store at least one type of data described herein. For example, the memory 100 may store input data, a tensor, output data, a filter, calculation result data of the operation unit, all data used in the fetch unit, etc. The memory 100 may be, but is not necessarily, formed as a data memory such as a static random access memory (SRAM) or a dynamic random access memory (DRAM).

The fetch unit 200 may read data required for a calculation from the input data stored in the memory 100 and provide the data to the operation unit 300. When the input data is a tensor, the fetch unit 200 may read the tensor stored in the memory 100 and feed the tensor to the operation unit 300 in accordance with a type of calculation. The type of calculation may be, for example, matrix multiplication, convolution, grouped convolution, etc. In this case, the fetch unit 200 may sequentially read a data group which has the same or a larger amount of data than a unit data throughput of one or more calculators provided in the operation unit 300, from the memory 100 and feed the data group to the operation unit 300.

The operation unit 300 may generate output data by processing a calculation of the input data received from the fetch unit 200. The operation unit 300 may be configured in accordance with (to correspond to) a type of calculation to be performed. As an example, the operation unit 300 may process the data fed from the fetch unit 200 in a streaming manner, but a method of processing the data is not limited thereto. The operation unit 300 may include the one or more calculators.

The commit unit 400 may store calculation result data output (e.g., in a streaming manner) from the operation unit 300 in the memory 100. In the case of performing an operation of storing the calculation result data received from the operation unit 300 in the memory 100, the commit unit 400 may store the calculation result data in the memory 100 on the basis of the type of calculation to be performed next. For example, the commit unit 400 may change the calculation result data into a preset form or a suitable form for subsequent calculation and store the transformed calculation result data in the memory 100.

Figure 2:
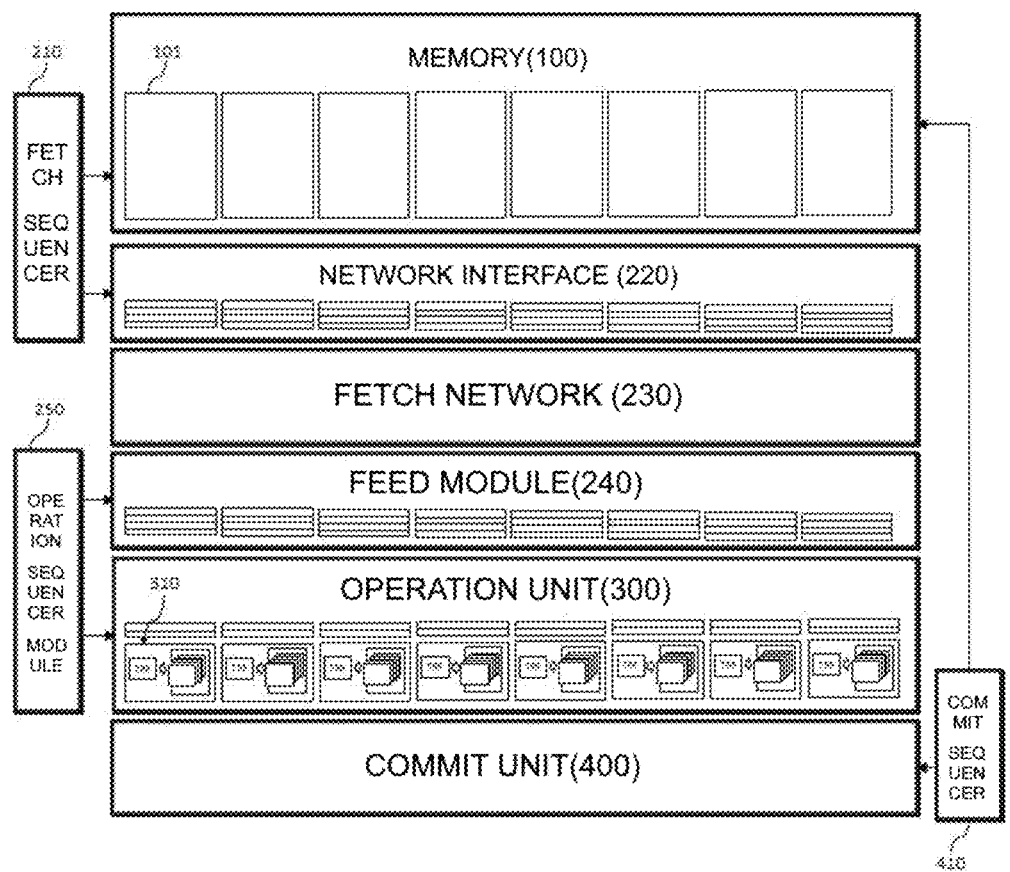
FIG. 2 is a detailed block diagram showing elements of the calculation processing device according to the present specification.

FIG. 2 is a detailed block diagram showing elements of the calculation processing device according to the present specification.

The above-described memory 100, fetch unit 200, operation unit 300, and commit unit 400 will be described in further detail below with reference to FIG. 2.

The memory 100 may be configured on the basis of memory address spaces. As an example, the memory address spaces may be consecutive or sequential. Also, the memory address spaces may be one dimensional (1D). However, the memory address spaces are not limited thereto and may have a two-or-more-dimensional arrangement. The internal structure of the memory 100 may be configured as a slice structure that is separately accessible. For example, the memory 100 may include a plurality of data memory slices 101. Here, the number of data memory slices 101 may be determined in accordance with the number of dot-product engines 310 included in the operation unit 300. As an example, the number of slices 101 may be equal to the number of dot-product engines 310 included in the operation unit 300. As an example, when the input data is a tensor, the tensor may be divided in a channel direction and a height direction and then stored in the data memory slices 101.

The fetch unit 200 may read data from the memory 100 and feed the data to the dot-product engines 310 of the operation unit 300. For example, the fetch unit 200 may include at least one of a fetch sequencer 210, a network interface 220, a fetch network 230, and an operation sequencer module 250. The fetch sequencer 210 may control a data fetch operation from the memory 100 to the network interface 220. The network interface 220 is intended to fetch data stored in the memory 100 and may provide an interface between the memory 100 and the fetch network 230. The fetch network 230 may transmit the fetched data to a feed module 240. The operation sequencer module 250 may control the operation unit 300 to perform a specific calculation by controlling the feed module 240 and the data input to the feed module 240.

The fetch network 230 of the fetch unit 200 may have one of various structures in accordance with calculation content and the shape of data. The fetch network 230 may be configured or reconfigured by software as a form of topology required by the operation unit 300. Also, the fetch network 230 may determine the topology in accordance with the shape of the input data and the type of calculation. The fetch network 230 may support various communication methods, such as direct, vertical multicast, channel multicast, vertical nearest-neighbor, etc., in accordance with a calculation performed by the operation unit 300, but communication methods supported by the fetch network 230 are not limited thereto.

For example, in the case of two-dimensional (2D) convolution, it is assumed that values of all input channels are to be input to the dot-product engines 310 separately calculating output activations. Accordingly, the fetch unit 200 may feed input activation values which are sequentially read in the channel direction to the dot-product engines 310 in a multicast manner. Also, the fetch unit 200 may use the fetch sequencer 210 to sequentially read data to be input to the operation unit 300 from the data memory slices 101. Data read from the data memory slices 101 by the fetch sequencer 210 may be transmitted to the operation unit 300 through the fetch network 230 of the fetch unit 200.

As described above, the fetch unit 200 may read tensor slices in parallel from the memory 100 and feed the tensor slices to the operation unit 300 in a form that is calculable by the operation unit 300. The fetch network 230 may further include a fetch network controller (not shown in FIG. 2) that configures and manages the fetch network 230 to the data read from the memory 100 to the operation unit 300 which requires the data.

The operation unit 300 may include the plurality of dot-product engines 310 which can perform parallel processing. As an example, the operation unit 300 may include 256 dot-product engines 310, but the number of dot-product engines 310 included in the operation unit 300 is not limited thereto. Each of the dot-product engines 310 may include one or more calculators (e.g., 32 multiply-and-accumulate (MAC) units). Each of the dot-product engines 310 may perform various calculations in accordance with the configuration of the calculators. The dot-product engines 310 of the operation unit 300 may also be divided in the channel direction and the height direction and perform calculation to generate output activations.

The operation unit 300 may include a register file (not shown) in addition to the dot-product engines 310.

The register file is a storage space for temporarily storing one of operands which are relatively frequently used or reused when the dot-product engines 310 perform calculation. For example, the register file may be an SRAM or a DRAM but is not limited thereto.

For example, when a calculation is performed in a neural network, in the case of a general convolution layer having a large activation size, weights may be stored in a register file, and activations may be stored in a memory. Also, in the case of a fully connected layer having a weight size larger than an activation size, weights may be stored in a memory, and activations may be stored in a register file.

As an example, when the operation unit 300 performs an MAC operation, the dot-product engines 310 may use the input data received from the fetch unit 200, register values received from register files present in the dot-product engines 310, and an accumulation value received from an accumulator as operands for performing the MAC operation. The calculation result may be stored back in the accumulator or transmitted to the commit unit 400 to be stored in the memory 100 as output data.

Meanwhile, as described above, the commit unit 400 may change an output activation calculated by the operation unit 300 into a form required for the next calculation and store the transformed output activation in the memory 100.

For example, in a neural network, the commit unit 400 may store an output activation calculated by a specific layer in the memory so that the activation may be used for calculation in the next layer. Also, the commit unit 400 may perform transpose (e.g., tensor manipulation) in accordance with a data form required for calculation in the next layer and store the results by transmitting the result to the memory 100 through a commit network (not shown).

In this way, after a calculation is performed by the operation unit 300, the commit unit 400 stores output data in the memory 100 in a desired form. To store the output data in the desired form, the commit unit 400 may perform data transpose (tensor transpose) using a data transpose module (not shown) and a commit network module (not shown).

Figure 3:
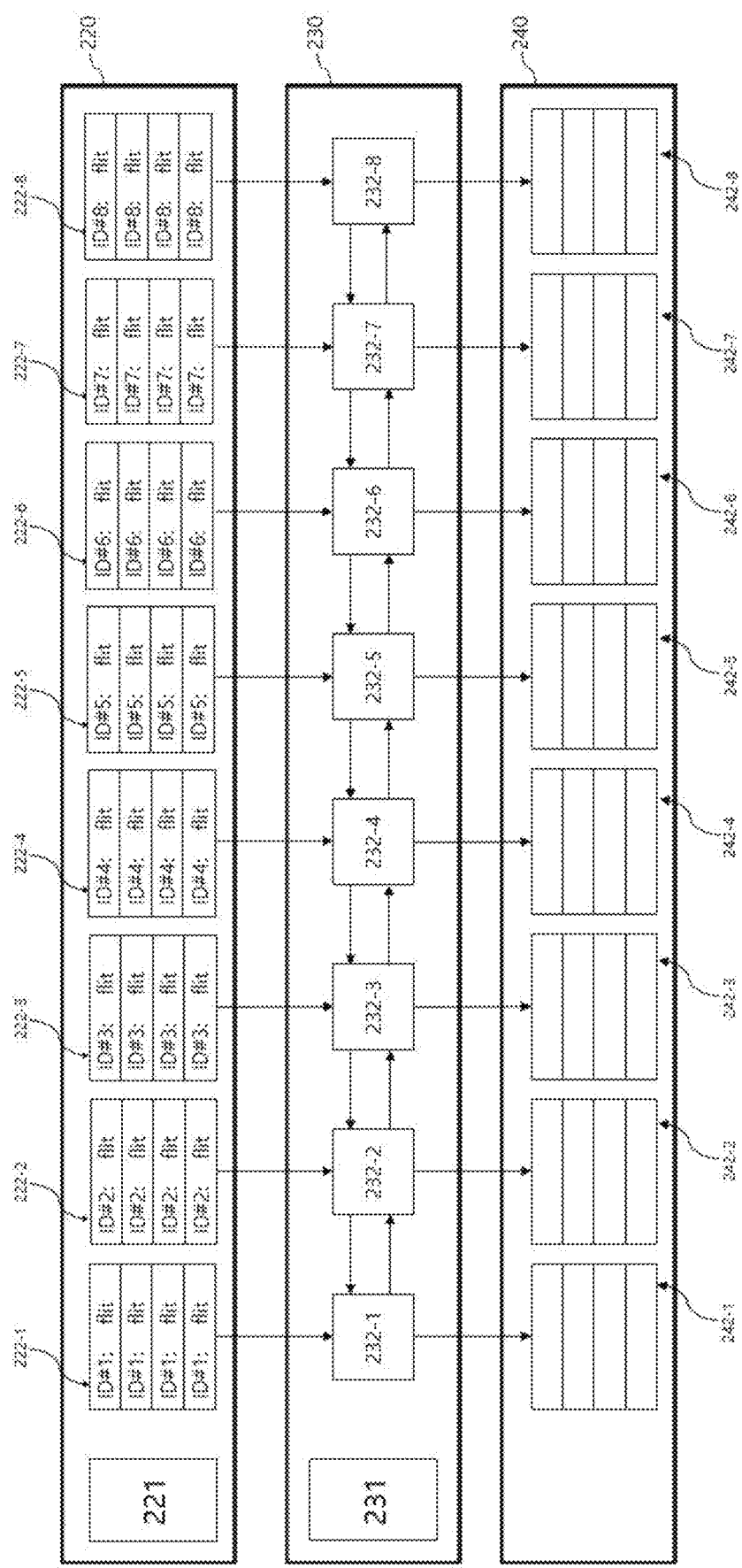
FIG. 3 is a block diagram showing a detailed configuration of a fetch unit according to an embodiment of the present specification.

FIG. 3 is a block diagram showing a detailed configuration of a fetch unit according to an embodiment of the present specification.

Referring to FIG. 3, the network interface 220, the fetch network 230, and the feed module 240 are included in the fetch unit 200 according to an embodiment of the present specification.

Data stored in each of the data memory slices 101 may be fetched through the network interface 220. The network interface 220 may include fetch buffers 222 for storing fetched data and an interface controller 221 for giving a node identifier (ID) corresponding to each data memory slice to the fetched data.

The fetch network 230 may include a plurality of routers 232 and a fetch network controller 231 to transmit the data fetched to the fetch buffers.

Each of the plurality of routers 232 may have a data processing mapping table. The data processing mapping table may represent a routing/flow control method (e.g., blocking, reflecting, outputting, etc.) of input data in accordance with a node ID of the input data. The fetch network controller 231 may rebuild a data processing mapping table. The data processing mapping table may be rebuilt adaptively for a type of calculation to be performed on corresponding data. As an example, the fetch network controller 231 may rebuild each of the data processing mapping tables of the plurality of routers 232 to form a topology in accordance with a type of calculation. The data processing mapping tables will be described in further detail below.

The feed module 240 may provide data received from the fetch network 230 to the operation unit 300. To this end, the feed module 240 may include feed buffers 242 for storing data output from the plurality of routers 232.

Meanwhile, the memory 100 may include one memory slice 101 or two or more data memory slices 101. The number of routers 232 may be related to the number of data memory slices 101. For example, the number of routers 232 may be determined on the basis of the number of data memory slices 101, or in reverse, the number of data memory slices 101 may be determined on the basis of the number of routers 232. As an example, the number of routers 232 may be the same as the number of data memory slices 101. In this case, the routers 232 and the data memory slices 101 may correspond to each other on a one-to-one basis. In the present specification, for convenience of understanding and simplicity of drawings, it is assumed that there are eight routers 232-1 to 232-8. Since data stored in the data memory slices 101 may be fetched to the fetch buffers 222 included in the network interface 220, FIG. 3 shows eight buffers 222-1 to 222-8 separated from each other. Accordingly, the fetch buffers 222 each correspond to the data memory slices 101, and data stored in each data memory slice 101 may be fetched to the corresponding fetch buffer 222. Although the example of FIG. 3 shows physically separated buffers for convenience of description, fetch buffers are not necessarily limited to physically separated buffers.

Also, in the present specification, data fetching and the like will be described with an example in which one data packet includes four flits. Accordingly, the interface controller 220 may give a node ID corresponding to each data memory slice 101 to each of the flits included in one data packet. Referring to the example shown in FIG. 3, four flits fetched to the first fetch buffer 222-1 are given a node ID "#1." Likewise, four flits fetched to the second fetch buffer 222-2 are given a node ID "#2," and flits fetched to each of the other fetch buffers 222-3 to 222-8 are given a node ID "#3," "#4," "#5," "#6," "#7," or "#8."

According to an embodiment of the present specification, the plurality of routers 232 may form a 1D mesh hardware topology. Each of the routers 232 may receive data fetched to a fetch buffer 222 and output the data to a feed buffer 242 or transmit the data to another adjacent router 232. For convenience of description, the plurality of routers will be named "first router 232-1," "second router 232-2," . . . , and "eighth router 232-8" from the leftmost router among the plurality of routers.

Figure 4:
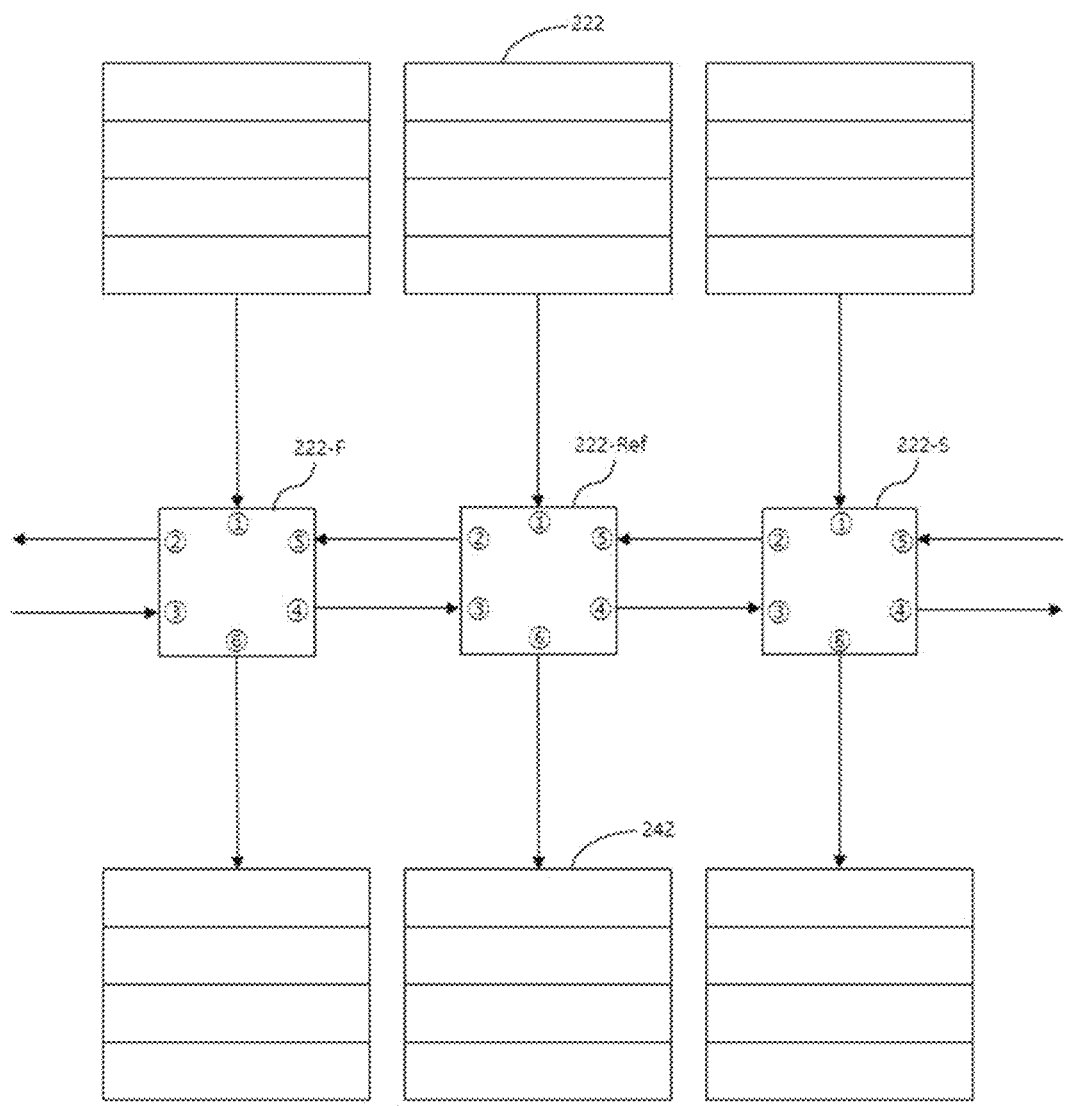
FIG. 4 is a reference diagram illustrating a configuration of a router according to the present specification.

FIG. 4 is a reference diagram illustrating a configuration of a router according to the present specification.

Referring to FIG. 4, there are three routers. The configuration of a router in accordance with the present specification will be described on the basis of a router 232-Ref positioned in the middle of the three routers. The left one of the two routers adjacent to the reference router 232-Ref is named "first router 232-F," and the right one is named "second router 232-S." The terms "first" and "second" are only used for the purpose of distinguishing the two routers adjacent to the reference router 232-Ref and do not represent a priority between the routers.

The routers 232 in accordance with the present specification may include a main input port ①, a first transmission output port ②, a first transmission input port ③, a second transmission output port ④, a second transmission input port ⑤, and a main output port ⑥. The main input port ① is a port to which data is input from the memory 101, that is, a fetch buffer 222. The first transmission output port ② is a port for transmitting data to the adjacent first router 232-F. The first transmission input port ③ is a port to which data transmitted from the adjacent first router 232-F is input. The second transmission output port ④ is a port for transmitting data to the adjacent second router 232-S. The second transmission input port ⑤ is a port to which data transmitted from the adjacent second router 232-S is input. The main output port ⑥ is a port for providing data to the operation unit 300, that is, the feed buffer 242.

Accordingly, data output through the first transmission output port ② of the reference router 232-Ref is input to the second transmission input port ⑤ of the first router 232-F. Data output through the second transmission output port ④ of the first router 232-F is input to the first transmission input port ③ of the reference router 232-Ref. Data output through the second transmission output port ④ of the reference router 232-Ref is input to the first transmission input port ③ of the second router 232-S. Data output through the first transmission output port ② of the second router 232-S is input to the second transmission input port ⑤ of the reference router 232-Ref.

Referring back to FIG. 3, the first transmission output port ② and the first transmission input port ③ of the first router 232-1 are not shown. Since the first router 232-1 may be at the leftmost position physically or in a software manner, the first transmission output port ② and the first transmission input port ③ may not exist. Alternatively, the first router 232-1 may have the first transmission output port ② and the first transmission input port ③ but may not use the ports in a software manner. For the same reason, the second transmission output port ④ and the second transmission input port ⑤ of the eighth router 232-8 are not shown.

Meanwhile, in the present specification, it is assumed that the routers 232 transmit data counterclockwise. Accordingly, when each of the routers 232 transmits data input through the main input port ① and the second transmission input port ⑤, the data is assumed to be transmitted only through the first transmission output port ②. Also, when each of the routers 232 transmits data input through the transmission input port ③, the data is assumed to be transmitted only through the second transmission output port ④. When input and output ports in a data transmission process are set as described above, it is possible to prevent overlapping output of data. Also, the calculation processing device according to the present specification is not limited to the counterclockwise transmission. When data transmission is changed to clockwise transmission, the relationship between input and output ports may also be changed.

Each of the routers 232 according to the present specification may read a node ID of data input through the main input port ① and process data having the node ID in accordance with the data processing mapping table. According to an embodiment of the present specification, the data processing mapping table may store information about whether or not to block, reflect, and output the input data. In other words, the router 232 according to the present specification may determine whether to block the data without transmitting the data to another router, whether to reflect the input data, and whether to output the input data in accordance with the node ID on the basis of the data processing mapping table. In relation to the data processing mapping table, a default operation of outputting data input from one adjacent router to another adjacent router (data transmission) may be set in the router 232 according to the present specification, but a default operation of the router 232 is not limited thereto. Accordingly, the data processing mapping table may be information about a method of processing data input from other routers.

In the data processing mapping table, "blocking" means not transmitting data which is input through the second transmission input port ⑤ or the first transmission input port ③, through the first transmission output port ② or the second transmission output port ④. In the data processing mapping table, "reflecting" means outputting data which is input through the second transmission input port ⑤ through the second transmission output port ④. Alternatively, in the data processing mapping table, "reflecting" means processing data which is to be output through the first transmission output port ② like data input through the first transmission input port ③. In the data processing mapping table, "outputting" means outputting data input through the first transmission input port ③, through the main output port ⑥.

Therefore, a software topology configured by the plurality of routers 232 may be diversified depending on content recorded in the data processing mapping tables. The fetch network controller 231 may set whether or not to perform blocking, reflecting, and outputting in accordance with the topology to be reconfigured, and thus the software topology may be determined by the fetch network controller 231. The data processing mapping tables will be described in further detail below with reference to various embodiments of FIGS. 5 to 12.

Figure 5:
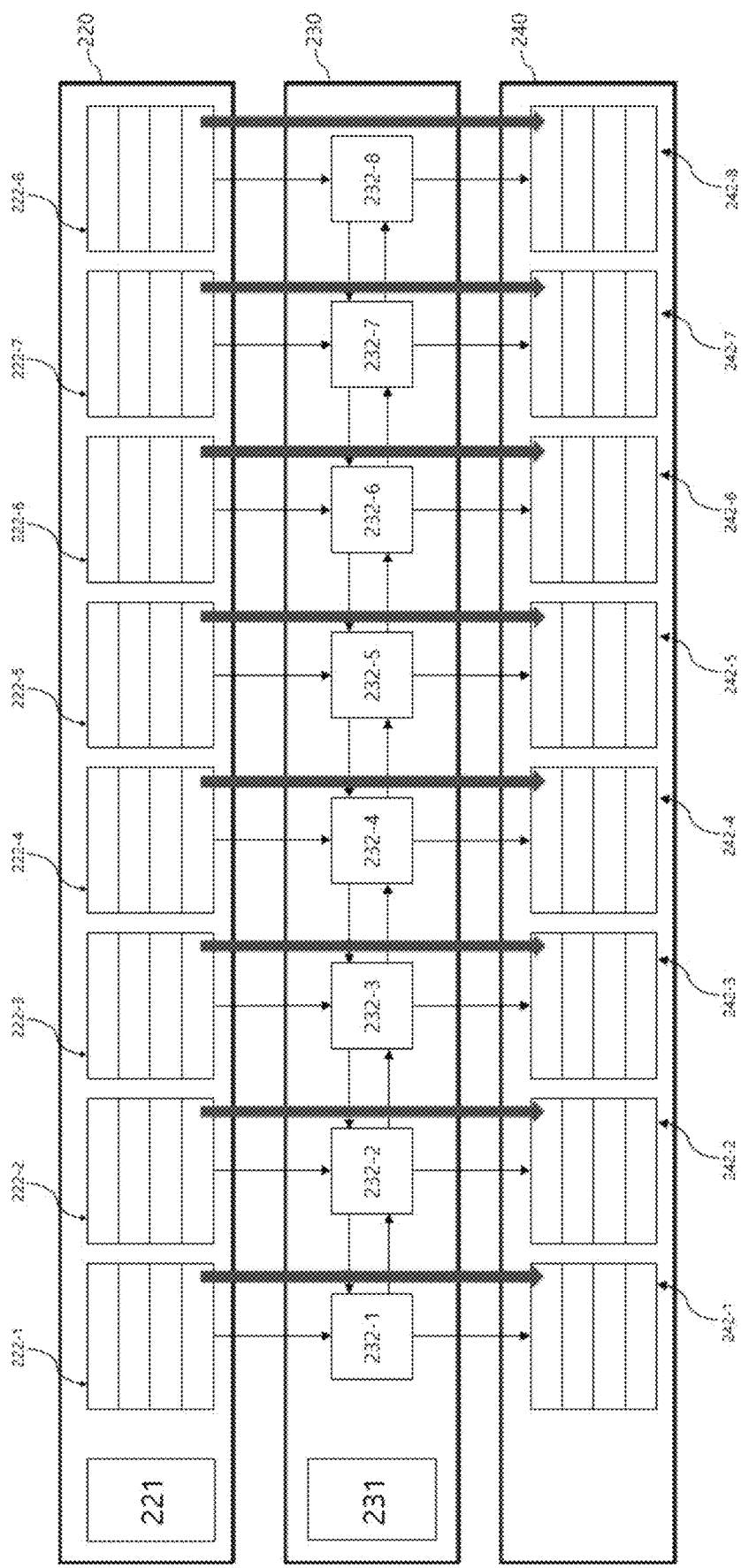
FIG. 5 shows a software topology according to a first embodiment.

FIG. 5 shows a software topology according to a first embodiment.

Referring to FIG. 5, the first embodiment is an example in which data fetched to each of the fetch buffers 222 is transmitted to one of the feed buffers 242. In other words, in the first embodiment, data stored in the first fetch buffer 222-1 is transmitted to the first feed buffer 242-1 only, and data stored in the second fetch buffer 222-2 is transmitted to the second feed buffer 242-2 only.

FIG. 6 is a reference diagram of a data processing mapping table according to the first embodiment.

Referring to FIG. 6, the data processing mapping table is divided by data processing method (e.g., blocking, reflecting, and outputting) in accordance with node IDs. In items of the data processing table, whether to perform a corresponding data processing method may be recorded. "1" represents that the corresponding item is performed, and "0" represents that the corresponding item is not performed.

Referring to the first router 232-1 of FIG. 5 in accordance with the data processing mapping table, ID #1 data is not blocked but is reflected and output. Since it is assumed in the present specification that the routers 232 transmit data counterclockwise, ID #1 data input through the main input port ① of the first router 232-1 is transmitted through the first transmission output port ②. At this time, since it is set in the data processing mapping table of the first router 232-1 that ID #1 data is reflected, ID #1 data to be output through the first transmission output port ② is processed like data input through the first transmission input port ③. Also, since it is set in the data processing mapping table of the first router 232-1 that ID #1 data is output, ID #1 data is output through the main output port ⑥. Other pieces of ID #2 to #8 data are blocked and neither reflected nor output. Accordingly, data fetched to the first fetch buffer 222-1 of FIG. 5 may be only output to the first feed buffer 242-1. Since the second router 232-2 to the eighth router 232-8 of FIG. 5 operate in the same way, overlapping description will not be unnecessarily repeated.

Figure 7:
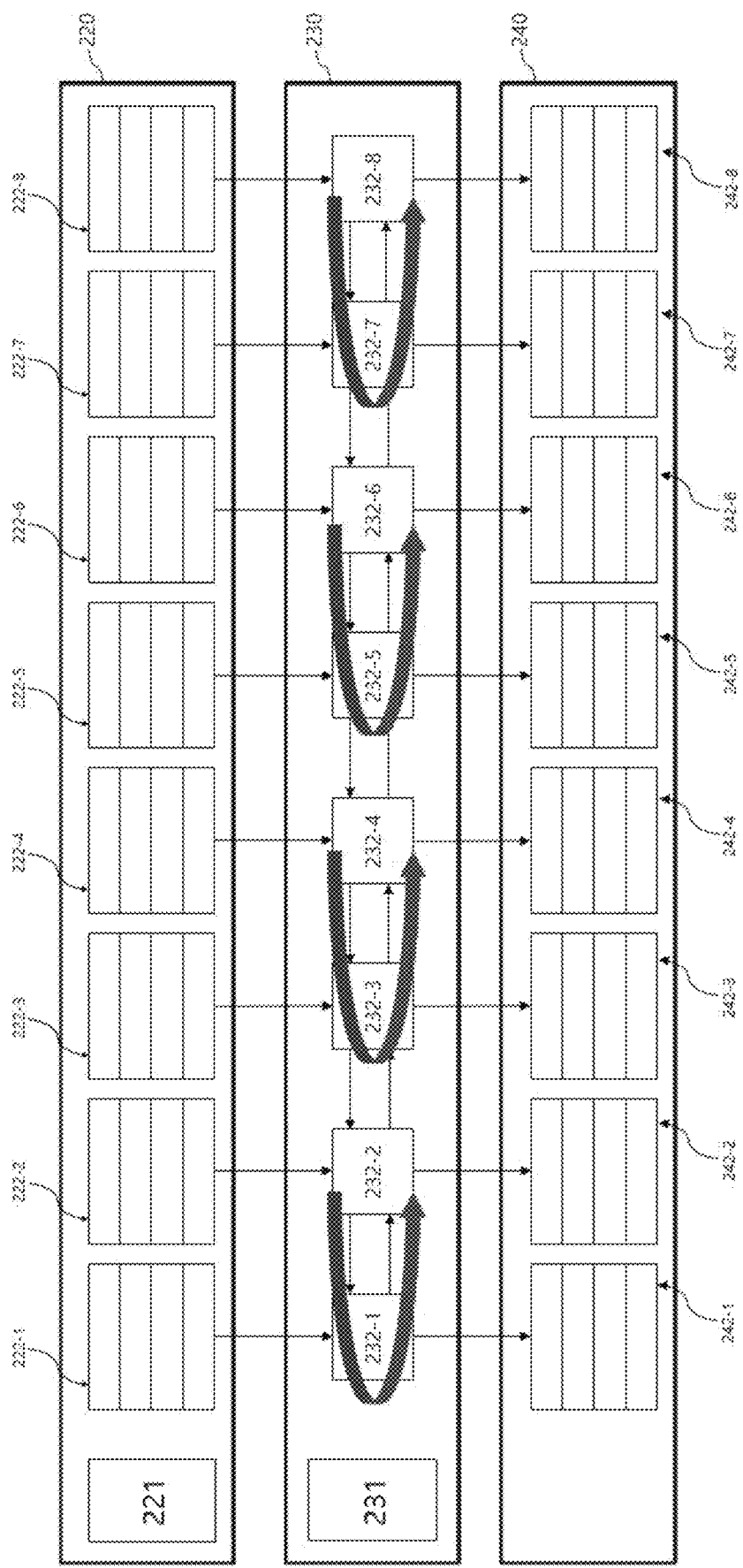
FIG. 7 shows a software topology according to a second embodiment.

FIG. 7 shows a software topology according to a second embodiment.

Referring to FIG. 7, the second embodiment is an example in which data fetched to each of the fetch buffers 222 is transmitted to two of the feed buffers 242. In other words, in the second embodiment, data stored in the first fetch buffer 222-1 is transmitted to the first feed buffer 242-1 and the second feed buffer 242-2, and data stored in the second fetch buffer 222-2 is transmitted to the first feed buffer 242-1 and the second feed buffer 242-2.

FIG. 8 is a reference diagram of a data processing mapping table according to the second embodiment.

Referring to the first router 232-1 of FIG. 7 in accordance with the data processing mapping table, ID #1 data is not blocked but is reflected and output. Since it was described in the first embodiment how the first router 232-1 outputs ID #1 data to the first feed buffer 242-1, overlapping description will be omitted. Since ID #1 data is processed like data input through the first transmission input port ③, ID #1 data may be transmitted to the second router 232-2 through the second transmission output port ④. Referring to the second router 232-2 of FIG. 7, ID #1 data is neither blocked nor reflected and is output. Accordingly, when ID #1 data is input from the first router 232-1, the second router 232-2 may output the ID #1 data to the second feed buffer 242-2. Consequently, data fetched to the first fetch buffer 222-1 can be output to the first feed buffer 242-1 and the second feed buffer 242-2.

Referring to the second router 232-2, ID #2 data is neither blocked nor reflected and is output. Since it is assumed in the present specification that the routers 232 transmit data counterclockwise, ID #2 data input through the main input port ① of the second router 232-2 may be transmitted to the first router 232-1 through the first transmission output port ②. Also, referring to the first router 232-1 of FIG. 7, ID #2 data is not blocked and is reflected and output. ID #2 data input to the first router 232-1 may be output to the first feed buffer 242-1 by the first router 232-1 like ID #1 data. Further, ID #2 data may be transmitted to the feed buffer 242-2 again. The second router 232-2 may output ID #2 data which is input again from the first router 232-1 through the first transmission input port ③, through the main output port ⑥. Accordingly, data fetched to the second fetch buffer 222-2 of FIG. 7 may be output to the first feed buffer 242-1 and the second feed buffer 242-2.

Meanwhile, in FIG. 7, ID #1 data is input through the first transmission input port ③ of the second router 232-2 and thus is output through the second transmission input port ④ of the second router 232-2. Accordingly, ID #1 data is not input back to the first router 232-1. In addition, the third router 232-3 blocks ID #1 data input through the first transmission input port ③ thereof. Also, the router 232-3 blocks ID #2 data input through the first transmission input port ③ thereof.

The first router 232-1 and the second router 232-2 of FIG. 7 block and neither reflect nor output other pieces of ID #3 to #8 data.

Since the third router 232-3, the fourth router 232-4, the fifth router 232-5, the sixth router 232-6, the seventh router 232-7, and the eighth router 232-8 of FIG. 7 operate in the same way, overlapping description will not be unnecessarily repeated.

Figure 9:
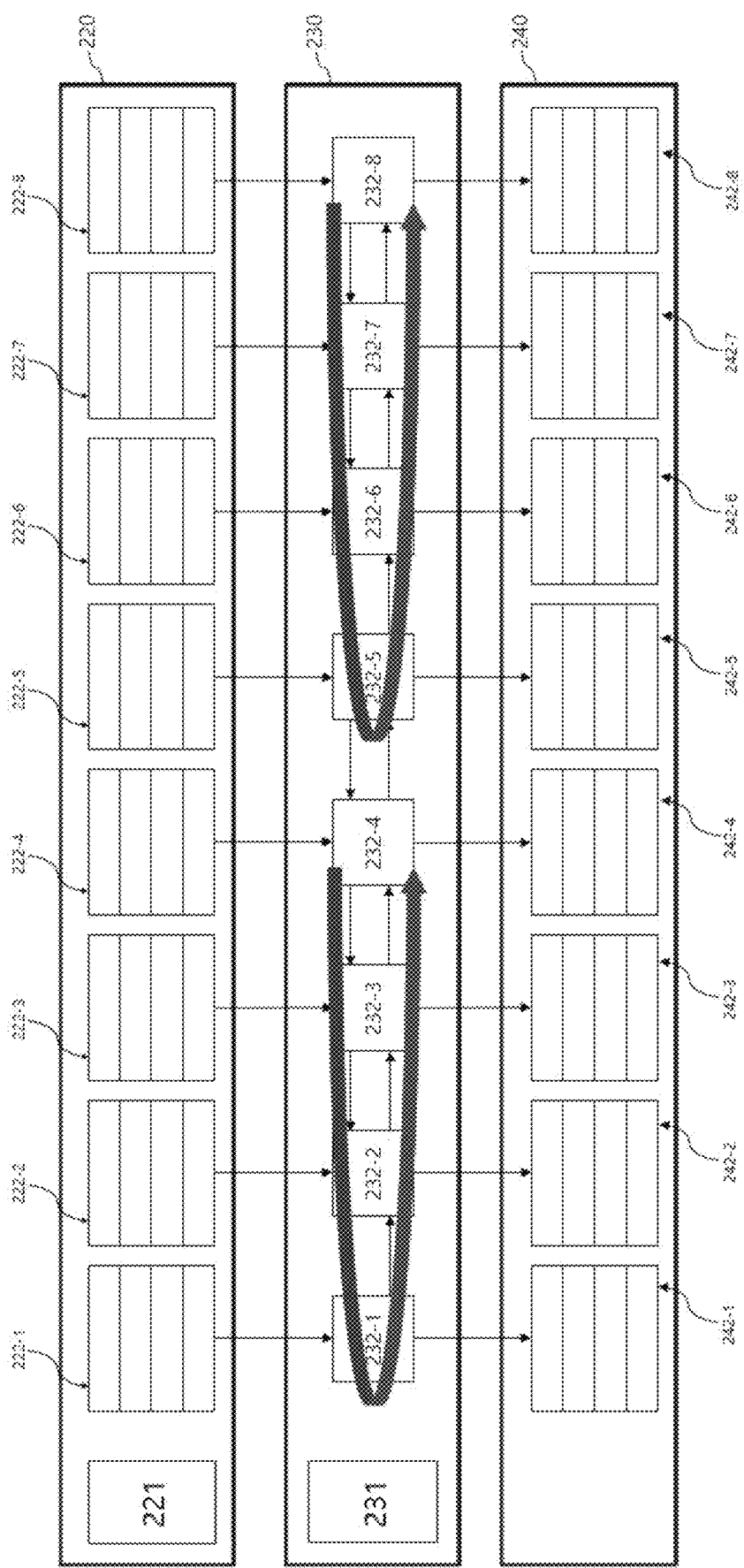
FIG. 9 shows a software topology according to a third embodiment.

FIG. 9 shows a software topology according to a third embodiment.

Referring to FIG. 9, the third embodiment is an example in which data fetched to each of the fetch buffers 222 is transmitted to four of the feed buffers 242. In other words, in the third embodiment, data stored in the first to fourth fetch buffers 222-1 to 222-4 is transmitted to the first to fourth feed buffers 242-1 to 242-4.

FIG. 10 is a reference diagram of a data processing mapping table according to the third embodiment.

Since processing of ID #1 data and ID #2 data has been described above through the first and second embodiments, processing of ID #3 data fetched to the third fetch buffer 222-3 of FIG. 9 will be representatively described in FIG. 10. First, ID #3 data fetched to the third fetch buffer 222-3 is input through the main input port ① of the third router 232-3 and output to the first transmission output port ② of the third router 232-3.

The second router 232-2 receives ID #3 data through the second transmission input port ⑤ and outputs ID #3 data to the first transmission output port ② thereof.

The first router 232-1 receives ID #3 data through the second transmission input port ⑤. According to the data processing mapping table of the first router 232-1, the first router 232-1 reflects and outputs ID #3 data. Accordingly, ID #3 data is output to the first feed buffer 242-1 through the main output port ⑥ and output to the second transmission output port ④ of the first router 232-1.

The second router 232-2 receives ID #3 data through the first transmission input port ③. According to the data processing mapping table of the second router 232-2, the second router 232-2 outputs ID #3 data. Accordingly, ID #3 data is output to the second feed buffer 242-2 through the main output port ⑥ and output to the second transmission output port ④ of the second router 232-2.

The third router 232-3 receives ID #3 data through the first transmission input port ③. According to the data processing mapping table of the third router 232-3, the third router 232-3 outputs ID #3 data. Accordingly, ID #3 data is output to the third feed buffer 242-3 through the main output port ⑥ and output to the second transmission output port ④ of the third router 232-3.

The fourth router 232-4 receives ID #3 data through the first transmission input port ③. According to the data processing mapping table of the fourth router 232-4, the fourth router 232-4 outputs ID #3 data. Accordingly, ID #3 data is output to the fourth feed buffer 242-4 through the main output port ⑥ and output to the second transmission output port ④ of the fourth router 232-4.

The fifth router 232-5 receives ID #3 data through the first transmission input port ③. According to the data processing mapping table of the fifth router 232-5, the fifth router 232-5 blocks ID #3 data, and thus ID #3 data is no longer output or transmitted.

Therefore, ID #3 data fetched to the third fetch buffer 222-3 of FIG. 9 may be transmitted to the first to fourth feed buffers 242-1 to 242-4. Likewise, ID #1 data, ID #2 data, and ID #4 data may also be transmitted to first to fourth feed buffers 242-1 to 242-4. Meanwhile, ID #5 data to ID #8 data may be transmitted to the fifth to eighth feed buffers 242-5 to 242-8 in the same way.

Figure 11:
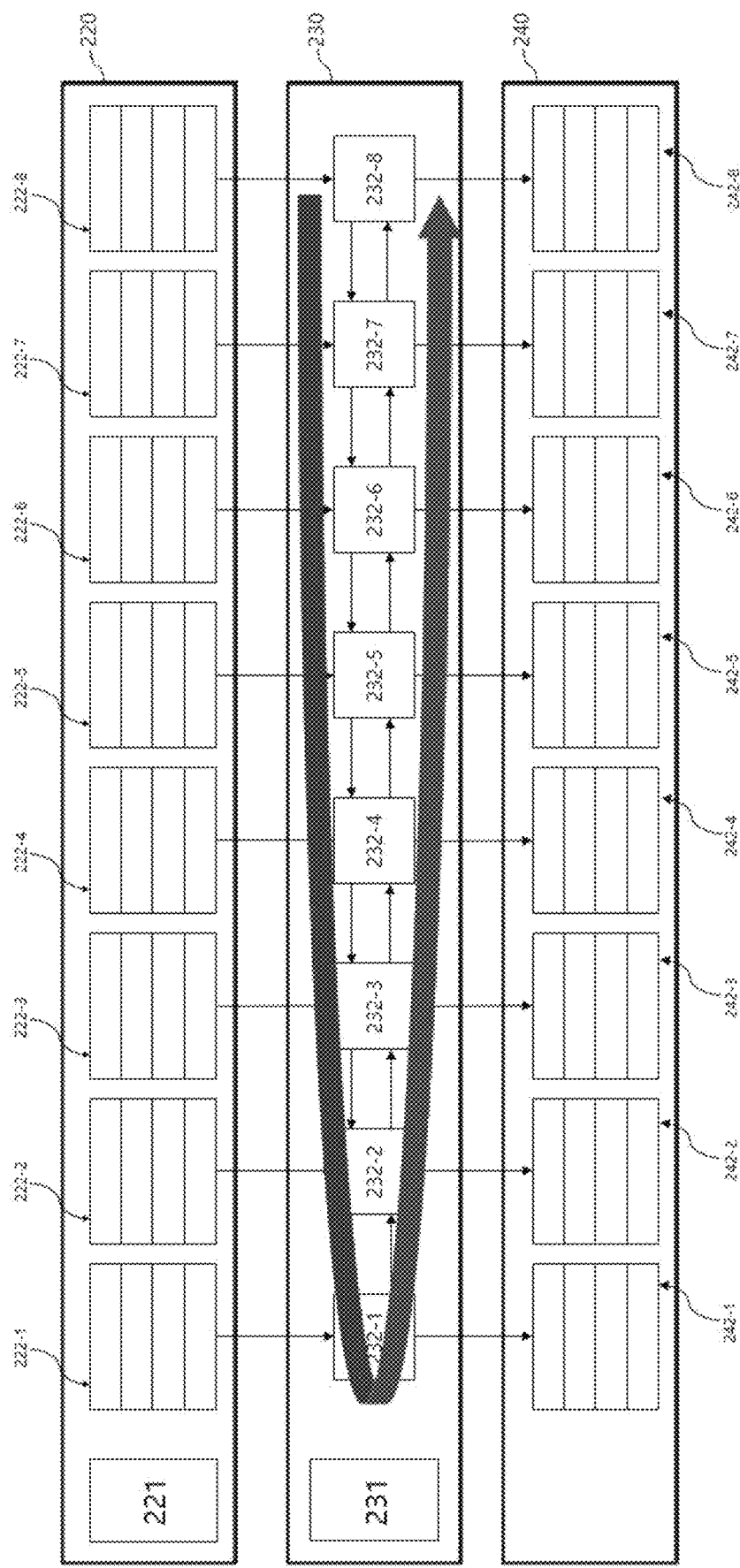
FIG. 11 shows a software topology according to a fourth embodiment.

FIG. 11 shows a software topology according to a fourth embodiment.

Referring to FIG. 11, the fourth embodiment is an example in which data fetched to each of the fetch buffers 222 is transmitted to all the feed buffers 242. In other words, in the fourth embodiment, data stored in the first to eighth fetch buffers 222-1 to 222-8 is transmitted to each of the first to eighth feed buffers 242-1 to 242-8.

FIG. 12 is a reference diagram of a data processing mapping table according to the fourth embodiment.

Since it has been described above through the first to third embodiments how each of the routers 232 processes input data in accordance with the data processing mapping table, overlapping description will be omitted. Also, as shown in FIGS. 5 to 12, the fetch network controller 231 may equally set blocking and outputting in the data processing mapping tables of routers 232 belonging to the same group in a reconfigured software topology.

Meanwhile, it has been described above how the routers 232 process one piece of data. However, it is necessary to process multiple pieces of data fetched to the multiple fetch buffers 222 together. The conventional art is a method of providing a sufficiently large buffer in routers to solve a problem when a collision occurs. On the other hand, the calculation processing device 10 according to the present specification may propose a method of effectively processing multiple pieces of data. To this end, the interface controller 231 may control a timing of inputting the fetched data to each of the routers in accordance with a node ID.

Figure 13:
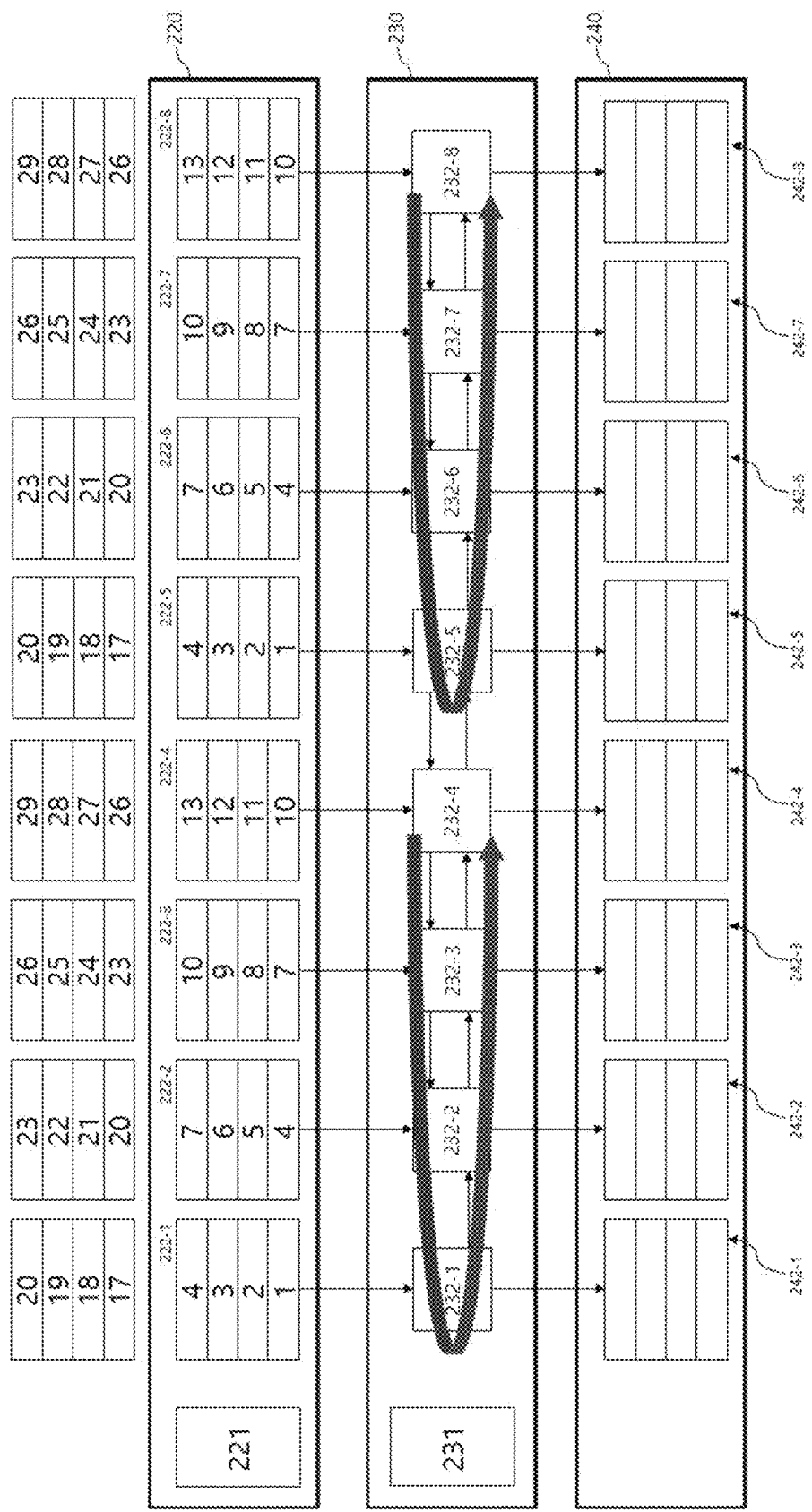
FIG. 13 is an example diagram of data input timings according to an embodiment of the present specification.

FIG. 13 is an example diagram of data input timings according to an embodiment of the present specification.

Referring to FIG. 13, a software topology of the plurality of routers 232 is the same as that of the third embodiment shown in FIG. 9. Accordingly, when data fetched to the first to fourth fetch buffers 222-1 to 222-4 is input to the first to fourth routers 232-1 to 232-4, the data is to be output to the first to fourth feed buffers 242-1 to 242-4 without any collision. Meanwhile, data input timings will be described through the third embodiment in the present specification, but the calculation processing device 10 according to the present specification is not limited to this example.

Since the present specification is described with an example in which one data packet includes four flits, data input timings will be distinctively described in units of flits. Accordingly, in the example shown in FIG. 13, numbers recorded in flits indicate an input order.

The interface controller 221 according to the present specification may calculate an initial waiting time of the fetched data in accordance with a node ID and input the fetched data to each of the routers 232 after the calculated initial waiting time.

Referring to FIG. 13, the first fetch buffer 222-1 has a first flit, and thus the interface controller 221 may input data fetched to the first fetch buffer 222-1 to the first router 232-1. Also, the second fetch buffer 222-2 has a fourth flit, and thus the interface controller 221 may wait for enough time for three flits to be input and then input data fetched to the second fetch buffer 222-1 to the second router 232-2 at the same time as the fourth flit is input from the first fetch buffer 222-1 to the first router 232-1. Likewise, the third fetch buffer 222-3 has a seventh flit, and thus the interface controller 221 may wait for enough time for six flits to be input and then input data fetched to the third fetch buffer 222-3 to the third router 232-3 at the same time as the seventh flit is input from the second fetch buffer 222-2 to the second router 232-2. Moreover, the fourth fetch buffer 222-4 has a tenth flit, and thus the interface controller 221 may wait for enough time for nine flits to be input and then input data fetched to the fourth fetch buffer 222-4 to the fourth router 232-4 at the same time as the tenth flit is input from the third fetch buffer 222-3 to the third router 232-3.

The interface controller 221 may calculate an initial waiting time using a node ID and a variable in accordance with a software topology of the routers 232 configured by the fetch network controller 231 on the basis of the data processing mapping tables. As an example, the interface controller 221 may calculate an initial waiting time corresponding to each of the fetch buffers 222 using Equation 1 below.

$$\text{warm\_up\_period} = \text{base} + (\text{router\_id} \% \text{\#\_nodes}) * \text{stride} \quad \text{[Equation 1]}$$

In Equation 1 above, "warm_up_period" is an initial waiting time, "base" is a basic time for which a system physically waits, "router_id" is the number of a router, "#_nodes" is the number of routers constituting a software topology, and "stride" is a variable for taking the number of routers into consideration. In the example shown in FIG. 13, four routers constitute a software topology. Accordingly, "router_id" is 0 to 3, "#_nodes" is 4, and "stride" is 3. For reference, the symbol "%" is a symbol of an operation of calculating the remainder of a division operation.

Assuming that the basic time "base" is "1," an initial waiting time of the first fetch buffer 222-1 is "1" ($=1\pm(0\%4)*3$). An initial waiting time of the second fetch buffer 222-2 is "4" ($=1+(1\%4)*3$). An initial waiting time of the third fetch buffer 222-3 is "7" ($=1+(2\%4)*3$). An initial waiting time of the fourth fetch buffer 222-4 is "10" ($=1\pm(3\%4)*3$).

According to the above description, first data packets of the first to fourth fetch buffers 222-1 to 222-4 are output to the routers 232, and then second data packets are to be output again beginning with the first fetch buffer 222-1. To this end, the interface controller 2221 may calculate an intermediate waiting time using the variable in accordance with the software topology of the routers 232. As an example, the interface controller 221 may calculate an intermediate waiting time of each of the fetch buffers 221 using Equation 2 below.

$$\text{injection\_period} = (\#\text{flits} * \#\_\text{nodes}) + (\#\_\text{nodes} * hop\ delay) \quad \text{[Equation 2]}$$

In Equation 2 above, "injection_period" is an intermediate waiting time, "#flits" is the number of flits included in one packet, "#_nodes" is the number of routers included in a software topology, and "hop delay" is a value related to a delay occurring in a transmission process between routers. Assuming that the hop delay time "hop delay" is "0," an intermediate waiting time of the first to fourth fetch buffers 222-1 to 222-4 is "16" (=(4*4)±(4*0)).

The interface controller 221 inputs a preset size of data (i.e., a data packet) to each of the routers 232. After the intermediate waiting time ends, the interface controller 221 may input the preset size of data (i.e., the data packet) to each of the routers again.

According to an embodiment of the present specification, the interface controller 221 may determine whether the intermediate waiting time has ended by adding the calculated intermediate waiting time to a waiting time of previous data. According to the example shown in FIG. 13, the value "16" related to the intermediate waiting time may be added to a previous waiting time of each of the fetch buffers 222, that is, the initial waiting time. Accordingly, a first flit of a second packet of the first fetch buffer 222-1 has a waiting time of "17" (=1+16). The first flit of the second packet of the second fetch buffer 222-2 has a waiting time of "20" (=4+16). The first flit of the second packet of the third fetch buffer 222-3 has a waiting time of "23" (=7+16). The first flit of the second packet of the fourth fetch buffer 222-4 has a waiting time of "26" (=10+16). The above content is written in Python as follows.

```
warm_up_cnt = warm_up_period
burst_cnt=0, injection_cnt=injection_period
if (warm_up_cnt > 0) warm_up_cnt--;
    else{
       if(injection_cnt > 0) injection_cnt--;
          else{
             burst_cnt=#flits;
             injection_cnt=injection_period
          }
       {
if(burst_cnt > 0){inject( ); burst_cnt--;}
```

According to an aspect of the present specification, data flow control logic is simplified, and thus buffers of routers can be removed or minimized. In this way, it is possible to reduce an area occupied by routers in a chip and also reduce power consumption. According to another aspect of the present specification, packet information for multicasting can be minimized. According to still another aspect of the present specification, even when the number of nodes increases, an increase in the cost can be minimized, and the maximum bandwidth can be achieved.

Although embodiments of the present specification have been described with reference to the accompanying drawings, those skilled in the technical field to which the present specification pertains should appreciate that the present invention can be implemented in other specific forms without changing the technical spirit or essential characteristics. Therefore, the above-described embodiments should be understood as illustrative and not restrictive in all aspects.

DESCRIPTION OF SIGNS

10: calculation processing device
100: memory
101: data memory slice
200: fetch unit
210: fetch sequencer
220: network interface
221: interface controller
222: fetch buffer
230: fetch network
231: fetch network controller
232: router
240: feed module
242: feed buffer
250: operation sequencer module
300: operation unit
310: dot-product engine
400: commit unit
410: commit sequencer

The invention claimed is:

1. A calculation processing device including a fetch unit which reads data required for a calculation for performing processing of a neural network from a memory and provides the data to an operation unit, wherein the fetch unit comprises:
a plurality of routers each having a data processing mapping table in which a method of processing input data is recorded according to a node identifier (ID) of the input data; and
a fetch network controller configured to rebuild the data processing mapping tables of the plurality of routers to create a software topology in accordance with a calculation type, wherein
the plurality of routers form a one-dimensional (1D) mesh hardware topology, and
each of the routers includes:
a main input port to which data is input from the memory;
a first transmission output port configured to transmit the data to an adjacent first router;
a first transmission input port to which data received from the adjacent first router is input;
a second transmission output port configured to transmit the data to an adjacent second router;
a second transmission input port to which data received from the adjacent second router is input; and
a main output port configured to provide the data to the operation unit.

2. The calculation processing device of claim 1, wherein the data processing mapping tables store information about whether or not to block, reflect, and output the input data.

3. The calculation processing device of claim 2, wherein the fetch network controller sets whether or not to block, reflect, and output the input data in accordance with a topology to be reconfigured.

4. The calculation processing device of claim 3, wherein the fetch network controller equally sets blocking and outputting in the data processing mapping tables of the routers belonging to the same group in the reconfigured topology.

5. The calculation processing device of claim 1, wherein the memory includes as many data memory slices as a number of the plurality of routers.

6. The calculation processing device of claim 5, wherein the fetch unit comprises:
a network interface to which data stored in each of the data memory slices is fetched;
a fetch network configured to transmit the data fetched to the network interface; and
a feed module configured to provide the data received from the fetch network to the operation unit, wherein the plurality of routers and the fetch network controller are included in the fetch network.

7. The calculation processing device of claim 6, wherein the network interface comprises:
- a fetch buffer configured to store the fetched data; and
- an interface controller configured to give node identifiers (IDs) each corresponding to the data memory slices to the fetched data.

8. The calculation processing device of claim 7, wherein the interface controller controls a timing of inputting the fetched data to each of the routers in accordance with each of the node IDs.

9. The calculation processing device of claim 8, wherein the interface controller calculates initial waiting times of the fetched data in accordance with the node IDs and inputs the fetched data to the routers after the calculated initial waiting times.

10. The calculation processing device of claim 9, wherein the interface controller calculates the initial waiting time using the node IDs and a variable in accordance with a software topology structure of the routers configured through the data processing mapping tables by the fetch network controller.

11. The calculation processing device of claim 10, wherein the interface controller calculates an intermediate waiting time using the variable in accordance with the software topology structure of the routers.

12. The calculation processing device of claim 11, wherein the interface controller inputs a preset size of data to each of the routers and after the intermediate waiting time ends, inputs the preset size of data again to each of the routers.

13. The calculation processing device of claim 12, wherein the interface controller adds the calculated intermediate waiting time to a waiting time of previous data and determines whether the intermediate waiting time has ended.

* * * * *